United States Patent Office 3,579,516
Patented May 18, 1971

3,579,516
BIS(THIOCARBAMYLTHIOMETHYL) POLYSULFIDES
Harry Elmer Albert, deceased, late of Lafayette Hill, Pa., by Dorothy S. Albert, executrix, Lafayette Hill, Pa., assignor to Pennwalt Corporation
No Drawing. Filed Nov. 29, 1968, Ser. No. 781,691
Int. Cl. C07d 87/46
U.S. Cl. 260—246                          10 Claims

ABSTRACT OF THE DISCLOSURE

Novel compounds having the structure

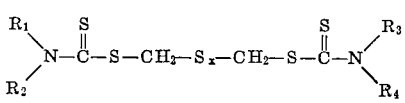

where $R_1$ and $R_3$ are alkyl or aryl, $R_2$ and $R_4$ are alkyl with the understanding that $R_1$ and $R_2$ and $R_3$ and $R_4$ may form a ring, and where $x$ is an integer of from 2 to 6. These new compositions are useful as accelerators for the sulfur vulcanization of unsaturated elastomers and may be used as vulcanizing agents.

---

This invention provides new compositions of matter which are very active accelerators for the sulfur vulcanization of unsaturated elastomers such as styrene-butadiene rubbers, natural rubber, and the recently developed elastomeric terpolymers of ethylene, propylene, and a conjugated diene which terpolymers are known as EPDM elastomers and are reported at page 15 of Chemical Engineering News, Jan. 23, 1967. These EPDM elastomers require a very high rate of cure for the proper degree of vulcanization and the compounds of this invention provide this necessary cure rate. The compounds of the invention are also very active as vulcanizing agents, and in many cases can be used to replace the combination of sulfur and accelerator for curing unsaturated elastomers.

The compounds of the invention have the following structure:

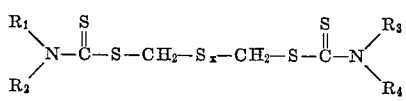

where $R_1$ and $R_3$ are alkyl or aryl, $R_2$ and $R_4$ are alkyl with the understanding that $R_1$ and $R_2$ and $R_3$ and $R_4$ may form a ring, and where $x$ is an integer of from 2 to 6. Preferred compounds are those where the R groups are alkyl of one to six carbon atoms and also where $R_1$ and $R_2$ and $R_3$ and $R_4$ form rings such as oxidiethylene, and pentamethylene.

The new compounds of this invention are readily derived in good yield from commercially available inexpensive raw materials. The reactions involved proceed rapidly at ordinary temperatures and are only mildly exothermic so that in most cases the preparations can be carried out without the added expense and inconvenience of using a solvent. Although a number of procedures can be used for the synthesis of these new componds, the best procedure is to use a secondary amine, hydrogen sulfide, sulfur, paraformaldehyde and carbon disulfide. For example, the preparation of bis(N,N-dimethylthiocarbamylthiomethyl)disulfide can be accomplished by the following sequence of reactions ("Me" is used to symbolize the methyl group and Et symbolizes the ethyl group):

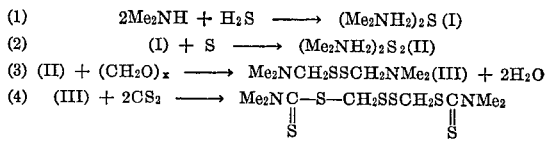

Water in small amounts is a convenient solvent for Steps (1) and (2) to prevent excessive solid separation. For Steps (3) and (4) it is a diluent, since the products of these reactions are not soluble in water. This method has the advantage of using reactions which proceed rapidly at room temperature and has the added advantage of avoiding the use of inorganic salts. The intermediates can be separated and purified if desired. This reaction sequence permits the isolation of crude product by simply removing, by evaporation or other means, the small amount of water present at the end of the reactions. In Reaction 3, aqueous formaldehyde can be used instead of paraformaldehyde.

An alternative to the above procedure involves the following reactions for the preparation of compound (II) above ("Ac" is used to symbolize the acetyl group):

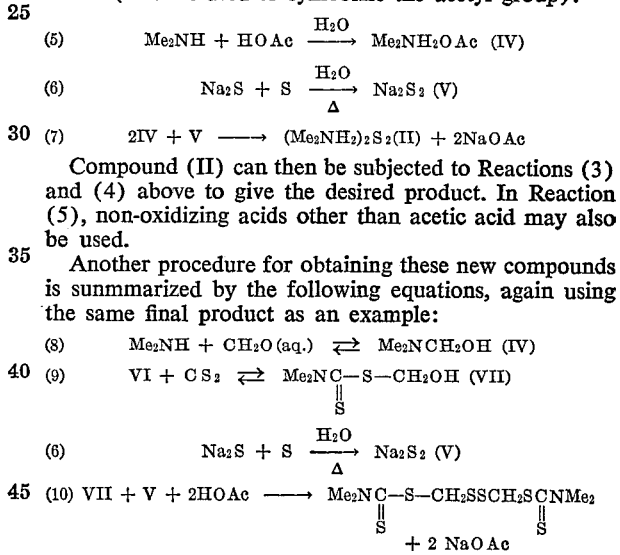

Compound (II) can then be subjected to Reactions (3) and (4) above to give the desired product. In Reaction (5), non-oxidizing acids other than acetic acid may also be used.

Paraformaldehyde can be used as a substitute for aqueous formaldehyde in Reaction (8). In Reaction (10), non-oxidizing acids other than acetic acid may also be employed.

The following examples illustrate the procedures employed for obtaining these compounds:

EXAMPLE 1

Bis(N,N-dimethylthiocarbamylthiomethyl) disulfide

To 325 g. (4.3 moles) of 60% dimethylamine in a three liter 3-neck flask, provided with a thermometer, motor-driven stirrer, reflux condenser and a gas inlet tube, 80.5 g. (2.36 moles) of hydrogen sulfide was added during stirring and cooling at room temperature. Addition of 69.0 g. (2.15 g. atoms) of powdered sulfur to the solution obtained in the above reaction was followed by a rapid reaction giving a clear dark red solution. Paraformaldehyde (136 g.=4.3 moles $CH_2O$) was then added in portions. It readily reacted, the dark red homogeneous solution changing to a greenish 2-phase reaction mixture. Addition of 360 g. (4.75 moles) of carbon disulfide was rapidly carried out and the reaction mixture was stirred 4 hours at room temperature. If desired, this step in the reaction sequence can be shortened by use of mild heating, for example at 45 to 50° C. The organic layer started to solidify so 300 ml. of benzene was added to facilitate stirring. After overnight stirring, 600 ml. of hexane was added and the solid product was filtered. The cream colored dry solid weighed 500 g., M.P. 96–106° C. An additional 32 g. of product was isolated from the organic layer of the filtrate. A portion of the product was purified by recrystallization from chloroform-hexane.

Analysis: Percent C=29.28, percent H=5.18, percent N=8.38, percent S=57.52, M.W.=389.—Calc'd: Percent C=28.88, percent H=4.85, percent N=8.42, percent S=57.85, M.W.=332.6.

Infrared absorption was consistent with the assigned structure.

EXAMPLE 2

Bis(N,N-dimethylthiocarbamylthiomethyl) trisulfide

In a 3-neck flask, provided with a motor-driven stirrer, reflux condenser, a thermometer and an addition funnel 112.5 g. (1 mole) of 40% dimethylamine was reacted with 81.0 g. (1 mole) of 37% aqueous formaldehyde, the latter being added slowly through the addition funnel during stirring and cooling. Then 76 g. (1 mole) of carbon disulfide was added under the same conditions. A mixture of 120 g. (0.5 mole) of $Na_2S \cdot 9H_2O$, 100 ml. of water and 32 g. (1 mole) of powdered sulfur was heated at 60° C. until all the sulfur dissolved and a clear red solution was obtained. This was cooled and added to the main reaction mixture. Acetic acid (60 g.—1 mole) was then added during stirring and cooling at room temperature and the reaction mixture was allowed to stir overnight at room temperature. The solid product was isolated by dissolving in chloroform and precipitating with hexane. The product (118.5 g.) was a tan solid melting at 67–81° C.

Analysis (percent): C=25.66, H=4.51, N=6.78, S=63.05. Cal'd (percent): C=26.3, H=4.42, N=7.71 S=61.6.

Infrared absorption was consistent with the assigned structure.

Examples for the other new compounds which have been prepared are summarized in Table I which follows:

TABLE 1
[Bis(thiocarbamylthiomethyl) polysulfides]

| Compound | Structure | Reactants (in order of addition) | Product | Analysis |
|---|---|---|---|---|
| Example 3.—Bis(N,N-dimethylthiocarbamylthiomethyl tetrasulfide. | $Me_2NC(=S)-S-CH_2-S-S$ <br> $Me_2NC(=S)-S-CH_2-S-S$ | 112.5 g. (1 mole) 40% dimethylamine. | 158 g. waxy brown solid, M.P. 53–87° C. | (Percent): C, 23.84; H, 4.45; N, 7.99; S, 63.04. |
| | | 81 g. (1 mole) 37% formaldehyde; 76 g. (1 mole) $CS_2$; 217 g. (0.5 mole) 40% sodium tetrasulfide; 60 g. (1 mole) acetic acid. | | Structure consistent with infrared absorption. Calc'd (percent): C, 24.21; H, 4.07; N, 7.06; S, 64.66. |
| Example 4.—Bis(N,N-dimethylthiocarbamylthiomethyl)pentasulfide. | $Me_2NC(=S)-S-CH_2-S-S$ <br> $Me_2NC(=S)-S-CH_2-S-S$ (with S branch) | A. {112.5 g. (1 mole) 40% dimethylamine; 81 g. (1 mole) 37% $CH_2O$; 76 g. (1 mole) $CS_2$. | 168.5 g. very viscous brown oil becoming a semi-solid on standing. | (Percent): C, 21.57; H, 4.0; N, 7.41; S, 65.75. |
| | | B. {120 g. (0.5 mole) $Na_2S \cdot 9H_2O$; 64 g. (2 g. atoms) powdered sulfur. B added to A, then added 60 g. (1 mole) acetic acid. | | Structure consistent with infrared absorption. <br> Calc'd (percent): C, 22.40; H, 3.76; N, 6.53; S, 67.30. |
| Example 5A.—Bis(N,N-diethylthiocarbamylthiomethyl) disulfide. | $Et_2NC(=S)-S-CH_2-S$ <br> $Et_2NC(=S)-S-CH_2-S$ | A. {120 g. (0.5 mole) $Na_2S \cdot 9H_2O$; 16 g. (0.5 g. atom) powdered sulfur. | 136.5 g. dark amber liquid. | (Percent): C, 38.53; H, 6.84; N, 7.84; S, 45.85. |
| | | B. {73 g. (1 mole) diethylamine; 81 g. (1 mole) 37% formaldehyde; 76 g. (1 mole) $CS_2$. A added to B, then added 60 g. (1 mole) acetic acid. | | Structure consistent with Infrared absorption. <br> Calc'd (Percent): C, 37.10; H, 6.23; N, 7.20; S, 49.5. |
| Example 5B.—Bis(N,N-diethylthiocarbamylthiomethyl) disulfide. | $Et_2NC(=S)-S-CH_2-S$ <br> $Et_2NC(=S)-S-CH_2-S$ | 118 g. (0.5 mole) N,N' (dithiodimethylene)bis(diethylamine) (prepared from $Et_2NH$, $H_2S$, S and paraformaldehyde); 91 g. (1.2 moles) $CS_2$. | 166.2 g. amber colored liquid. | (Percent): S, 44.60. |
| Example 6.—Bis(N,N-diethylthiocarbamylthiomethyl)trisulfide. | $Et_2NC(=S)-S-CH-S$ <br> $Et_2NC(=S)-S-CH-S$ (with S) | 35.4 g. (0.15 mole) N,N'-(dithiodimethylene) bis-(diethylamine). | 42.7 g. dark yellow liquid. | (Percent): C, 34.21; H, 5.95; N, 7.04; S, 52.80 (by difference) |
| | | 4.8 g. (0.15 g. atom) powdered sulfur. <br> 22.8 g. (0.3 mole) $CS_2$. | | Structure consistent with Infrared absorption. <br> Calc'd (percent): C, 34.25; H, 5.75; N, 6.67; S, 53.4. |
| Example 7.—Bis(N,N-diisopropylthiocarbamylthiomethyl) disulfide. | $(Me_2CH)_2NC(=S)-S-CH-S$ <br> $(Me_2CH)_2NC(=S)-S-CH-S$ | A. {0101 g. (1 mole) diisopropylamine; 81 g. (1 mole) 37% formaldehyde; 76 g. (1 mole) $CS_2$. | 108 g. amber viscous oil. | (Percent): C, 43.69; H, 7.67; N, 6.26; S, 42.8. |
| | | B. {120 g. (0.5 mole) $Na_2S \cdot 9H_2O$; 16 g. (0.5 g. atom) powered sulfur. B added to A then added 60 g. (1 mole) acetic acid. | | Structure consistent with infrared absorption. <br> Calc'd (percent): C, 43.2; H, 7.25; N, 6.30; S, 43.25. |

TABLE 1—Continued

| Compound | Structure | Reactants (in order of addition) | Product | Analysis |
|---|---|---|---|---|
| Example 8A.—Bis(N,N-di-n-butylthiocarbamylthiomethyl) disulfide. | $(n\text{-}C_4H_9)_2N\overset{S}{\overset{\|}{C}}\text{-}S\text{-}CH\text{-}S$<br>$(n\text{-}C_4H_9)_2N\overset{S}{\overset{\|}{C}}\text{-}S\text{-}CH\text{-}S$ | A. {129 g. (1 mole) di-n-butylamine; 81 g. (1 mole) 37% $CH_2O$; 76 g. (1 mole) $CS_2$.<br>B. {120 g. (0.5 mole) $Na_2S.9\text{-}H_2O$; 16 g. (0.5 g. atom) powdered sulfur.<br>B added to A, then added 60 g. (1 mole) acetic acid. | 187 g. brown mushy solid. Recrystallized product a white solid M.P. 52–54° C. | Crude.—(Percent): C, 50.10; H, 8.75; N, 5.56; S, 35.12.<br><br>Calc'd (percent): C, 47.9; H, 8.05; N, 5.60; S, 38.45.<br><br>Purified product analysis.—(Percent): C, 48.12; H, 8.15; N, 5.79; S, 38.36. Structure consistent with infrared absorption. |
| Example 8B.—Bis(N,N-di-n-butylthiocarbamylthiomethyl) disulfide. | $(n\text{-}C_4H_9)_2N\overset{S}{\overset{\|}{C}}\text{-}S\text{-}CH\text{-}S$<br>$(n\text{-}C_4H_9)_2N\overset{S}{\overset{\|}{C}}\text{-}S\text{-}CH\text{-}S$ | 258 g. (2 moles) di-n-butylamine; 35 g. (1.03 moles) $H_2S$; 32 g. (1 g. atom) powdered sulfur (excess $H_2S$ removed with $N_2$); 166 g. (2.05 moles) 37% $CH_2O$; 159.6 g. (2.1 moles) $CS_2$. | 353.5 g. brown oil solidified in refrigerator). Recrystallized product a white solid M.P. with product from Example 8A. (M.P. 52–54° C.) gave no depression. | |
| Example 9.—Bis(N,N-oxydiethylenethiocarbamylthiomethyl) disulfide. | 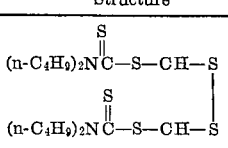 | A. {87 g. (1 mole) morpholine; 81 g. (1 mole) 37% $CH_2O$; 76 g. (1 mole) $CS_2$.<br>B. {120 g. (0.5 mole) $Na_2S.9\text{-}H_2O$; 16 g. (0.5 g. atom) powdered sulfur.<br>B added to A, then added 60 g. (1 mole) acetic acid. | From half of crude product (176 g. of oil) 58 g. white powder obtained by $CS_2$ treatment M.P. 95–113° C., recrystallized M.P. 121–123° C. | Purified product.—(Percent): C, 33.61; H, 4.73; S, 47.50; N, 6.59; O, 7.57 (by difference). Structure consistent with infrared absorption.<br>Calc'd (Percent): C, 34.55; H, 4.84; S, 46.20; N, 6.72; O, 7.71. |

The new compounds of this invention have varying storage stabilities. No storage stability problems have been encountered with the disulfides. These have undergone storage at room temperature for periods close to a year with no apparent change. However, some of the higher polysulfides have some tendency to decompose slowly in standing with the evolution of $H_2S$. It has been found that the storage stability of such compounds can be improved greatly by the addition of zinc oxide. For example, bis(dimethylthiocarbamylthiomethyl) tetrasulfide containing 5% zinc oxide (based on organic tetrasulfide) is stable on prolonged storage at room temperature, but an unstabilized sample gave a slight amount of $H_2S$ evolution after about 3 weeks at room temperature. For stabilization of liquids by zinc oxide, settling can be avoided by converting to a solid using an inexpensive carrier, such as a synthetic hydrous calcium silicate along with the zinc oxide stabilizer.

Additional compounds which come under the scope of this invention are the following:

Bis(N,N-pentamethylenethiocarbamylthiomethyl) disulfide
Bis(N,N-pentamethylenethiocarbamylthiomethyl) tetrasulfide
Bis(N,N-tetramethylenethiocarbamylthiomethyl) disulfide
Bis(N,N-tetramethylenethiocarbamylthiomethyl) trisulfide
Bis(N,N-diamylthiocarbamylthiomethyl) disulfide
Bis(N,N-di-n-hexylthiocarbamylthiomethyl) disulfide
Bis(N,N-di(2-ethylhexyl)thiocarbamylthiomethyl) disulfide
Bis(N,N-dibutylthiocarbamylthiomethyl) trisulfide
Bis(N,N-diisobutylthiocarbamylthiomethyl) disulfide
Bis(N,N-oxydiethylenethiocarbamylthiomethyl) trisulfide
N,N-dimethylthiocarbamylthiomethyl N',N'-diethylthiocarbamylthiomethyl disulfide
N,N-dimethylthiocarbamylthiomethyl N',N'-diethylthiocarbamylmethyl trisulfide
Bis(thiocarbamylthiomethyl) disulfide from various amine mixtures (such as dimethylamine+diethylamine+dibutylamine)
Bis(thiocarbamylthiomethyl) trisulfide from various amine mixtures (such as dimethylamine+diethylamine)
Bis(N-phenyl-N-methylthiocarbamylthiomethyl) disulfide
Bis(N-phenyl-N-ethylthiocarbamylthiomethyl) disulfide The compounds of the invention may be used with natural rubber and with various synthetic elastomers including, as indicated above, the styrene-butadiene rubbers, the acrylonitrile-butadiene rubbers, polychloroprene, and other elastomers which are vulcanizable with sulfur, such as the numerous sulfur vulcanizable dienes and their copolymers with acrylates and the like. As already indicated, the compounds are also useful for the new EPDM elastomers. These ethylene propylene terpolymers used as a third comonomer unsaturated compounds such as 1,4-hexadiene, ethylidene norbornene, methylene norbornene, dicyclopentadiene, and the like. The amount of the compound used will generally be from about 0.1 to about 5 parts per 100 parts of rubber (phr.) preferably from about 0.3 to 2.0 phr.

Evaluation procedures for the compounds of the invention follow:

(A) EVALUATION IN NATURAL RUBBER

| | |
|---|---|
| Smoked sheet blend | 100.0 |
| Zinc oxide | 5.0 |
| Stearic acid | 2.0 |
| Atomite whiting | 50.0 |
| Spider sulfur | 3.0 |
| | 160.0 |

The chemicals to be tested were milled into a portion of this masterbatch. The test results are summarized in Table A. These test results show the product of Example 1 to be a very active accelerator at 0.5 phr. (parts per hundred parts of rubber), giving a much more rapid cure than the stock without added accelerator (the control) and producing very superior physical properties. The tensile strength values obtained were significantly better than those given by tetramethylthiuram disulfide, a widely used commercial accelerator.

TABLE A.—EVALUATION OF BIS(DIMETHYLTHIOCARBAMYLTHIOMETHYL) DISULFIDE AS AN ACCELERATOR IN NATURAL RUBBER

| Cure in minutes at 298° F. | 300% modulus | Tensile strength | Elongation |
|---|---|---|---|
| Control (no accelerator) | | | |
| 10 | (¹) | (¹) | (¹) |
| 20 | 150 | 350 | 500 |
| 40 | 175 | 600 | 600 |
| 0.5 phr., Bis(dimethylthiocarbamylthiomethyl) disulfide (Example 1) | | | |
| 10 | 400 | 3,350 | 700 |
| 20 | 375 | 3,125 | 710 |
| 40 | 300 | 3,000 | 730 |
| 0.5 phr., tetramethylthiuram disulfide (methyl thiram) | | | |
| 10 | 450 | 2,675 | 600 |
| 20 | 400 | 2,675 | 650 |
| 40 | 350 | 2,500 | 670 |

¹ No cure.

(B) Evaluation in SBR

Test compound

| | |
|---|---:|
| SBR 1500 | 100.0 |
| HAF black | 50.0 |
| Zinc oxide | 5.0 |
| Stearic acid | 3.0 |
| Polymeric saturated petroleum hydrocarbon softener (Paraflux, C. P. Hall Co.) | 10.0 |
| Blackbird sulfur | 2.0 |
| | 170.0 |

The chemicals to be evaluated were milled into portions of this masterbatch. The results are summarized in Table B. These data show the products of Examples 5 and 8 to be very active accelerators for the sulfur vulcanization of SBR giving excellent physical properties, and both are considerably more active than 2,2'-dithiobisbenzothiazole, a commercial accelerator widely used in SBR. Increasing the rate of cure by increased accelerator concentration is illustrated with the product of Example 8. With the SBR masterbatch alone (control—no added accelerator but containing sulfur), no measurable tensile properties were obtained under the cure conditions employed in the tests of Table B.

TABLE B.—EVALUATION OF BIS(DIALKYLTHIOCARBAMYLTHIOMETHYL) POLYSULFIDES AS ACCELERATOR IN SBR 0.5 phr., Bis(N,N-diethylthiocarbamylthiomethyl) disulfide (Example 5)

| Cure in minutes at 298° F. | 300% modulus | Tensile strength | Elongation |
|---|---|---|---|
| 10 | 825 | 2,700 | 780 |
| 20 | 1,600 | 3,500 | 600 |
| 40 | 1,925 | 3,375 | 500 |
| 80 | 2,100 | 3,725 | 490 |

0.5 and 2.0 phr., Bis(N,N-di-n-butylthiocarbamylthiomethyl) disulfide (Example 8)

| Cure in minutes at 298° F. | 300% modulus at— | | Tensile strength at— | | Elongation at— | |
|---|---|---|---|---|---|---|
| | 0.5 phr. | 2.0 phr. | 0.5 phr. | 2.0 phr. | 0.5 phr. | 2.0 phr. |
| 10 | 200 | 1,875 | 400 | 3,575 | 1,000 | 500 |
| 20 | 875 | 2,425 | 2,750 | 3,375 | 850 | 400 |
| 40 | 1,275 | 2,800 | 3,450 | 3,225 | 700 | 340 |
| 80 | 1,700 | 2,850 | 3,550 | 4,075 | 560 | 320 |

0.5 and 2.0 phr., 2,2'-dithiobisbenzothiazole (a commercial accelerator)

| 10 | No cure. | 200 | No cure. | 400 | No cure. | 950 |
| 20 | No cure. | 800 | No cure. | 2,600 | No cure. | 710 |
| 40 | 200 | 1,400 | 525 | 3,450 | 800 | 650 |
| 80 | 575 | 1,825 | 1,975 | 3,200 | 790 | 500 |

NOTE: A control (no additive) did not cure under any of the above conditions.

(C) EVALUATION IN EPDM

Test compound

| | |
|---|---:|
| "Royalene" 301 | 50.0 |
| "Royalene" 400 | 100.0 |
| FEF Black | 100.0 |
| Zinc oxide | 5.0 |
| Stearic acid | 2.0 |
| Sulfur | 0.5 |
| 2-mercapto benzothiazole | 0.5 |
| | 258.0 |

"Royalene" 301 is a general purpose gum EPDM synthetic rubber, a terpolymer of ethylene, propylene and a non-conjugated diene understood to be dicyclopentadiene. "Royalene" 400 is similar to "Royalene" 301, but is extended with 100 phr. of a naphthenic oil. Thus the test stock used is on the basis of 100 parts of EPDM gum elastomer. This masterbatch was used to obtain the results given in Table C. These results show the product of Example 2 to be a very active accelerator, showing significant advantages in tensile strength and elongation over tetramethylthiuram disulfied, one of the preferred commercial accelerators now used in EPDM.

TABLE C.—EVALUATION OF BIS(DIMETHYLTHIOCARBAMYLTHIOMETHYL) TRISULFIDE AS AN ACCELERATOR IN EPDM SYNTHETIC RUBBER 4.0 phr., Bis(dimethylthiocarbamylthiomethyl) trisulfide (Example 2)

| Cure in minutes at 320° F. | 300% modulus | Tensile strength | Elongation |
|---|---|---|---|
| 20 | 1,050 | 1,625 | 550 |
| 30 | 1,300 | 1,925 | 450 |
| 40 | 1,400 | 2,100 | 460 |
| 60 | 1,475 | 2,075 | 420 |

4.0 phr., Tetramethylthiuram disulfide (methyl thriam)

| 20 | 1,125 | 1,625 | 450 |
| 30 | 1,275 | 1,725 | 400 |
| 40 | 1,375 | 1,750 | 400 |
| 60 | 1,425 | 1,775 | 360 |

NOTE: With this masterbatch plus sulfur, but no added accelerator, extremely low physical properties are obtained.

(D) EVALUATION AS VULCANIZING AGENTS IN NATURAL RUBBER

Test stock

| | |
|---|---:|
| Smoked sheet | 100 |
| MT Black | 20 |
| Zinc oxide | 1 |
| 2-mercaptobenzothiazole | 1 |

Test compounds were milled into this masterbatch to produce rubber stocks from which the results of Table D were obtained. The data of this table show a high level of activity for the products evaluated. The product of Example 1 gave better tensile values than tetramethylthiuram disulfied, a widely used commercial vulcanizing agent and the product of Example 2 gave superior modulus values.

TABLE D.—EVALUATION OF BIS(DIALKYLTHIOCARBAMYLTHIOMETHYL) POLYSULFIDES AS VULCANIZING AGENTS FOR NATURAL RUBBER 4.0 phr., Bis(dimethylthiocarbamylthiomethyl) disulfide (Example 1)

| Cure in minutes at 298° F. | 300% modulus | Tensile strength | Elongation |
|---|---|---|---|
| 20 | 275 | 3,325 | 700 |
| 60 | 350 | 3,850 | 630 |

4.0 phr., Tetramethylthiuram disulfide (methyl thriam) (Control)

| 20 | 300 | 2,875 | 660 |
| 60 | 350 | 2,725 | 650 |

4.0 phr., Bis(dimethylthiocarbamylthiomethyl) trisulfide (Example 2)

| 20 | 475 | 2,850 | 590 |
| 60 | 500 | 2,750 | 580 |

NOTE: With no additive (control) no measurable tensile properties are obtained.

It is obvious from the above data that the products of this invention are potentially cheap organic compounds, easily prepared in good yields from readily available inexpensive starting materials. They are extremely active accelerators for vulcanization of unsaturated elastomers and also have activity as vulcanizing agents for such elastomers in the absence of sulfur.

It will be understood that numerous changes and variations may be made from the above description of the invention and the examples shown without departing from the spirit and scope of the invention.

I claim:

1. A compound of the formula

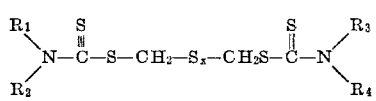

where $R_1$ and $R_3$ are alkyl having 1 to 8 carbon atoms or phenyl, $R_2$ and $R_4$ are alkyl having 1 to 8 carbon atoms and each of $R_1$—$R_2$ and $R_3$—$R_4$ taken together with the nitrogen atom to which they are attached form piperidino, pyrrolidino or morpholino, and $x$ is an integer from 2 to 5.

2. A compound as in claim 1 where $R_1$, $R_2$, $R_3$ and $R_4$ are methyl, and $x$ is 2.

3. A compound as in claim 1 where $R_1$, $R_2$, $R_3$ and $R_4$ are methyl and $x$ is 3.

4. A compound as in claim 1 where $R_1$, $R_2$, $R_3$ and $R_4$ are methyl and $x$ is 4.

5. A compound as in claim 1 where $R_1$, $R_2$, $R_3$ and $R_4$ are methyl and $x$ is 5.

6. A compound as in claim 1 where $R_1$, $R_2$, $R_3$ and $R_4$ are ethyl and $x$ is 2.

7. A compound as in claim 1 where $R_1$, $R_2$, $R_3$ and $R_4$ are ethyl, and $x$ is 3.

8. A compound as in claim 1 where $R_1$, $R_2$, $R_3$ and $R_4$ are isopropyl and $x$ is 2.

9. A compound as in claim 1 where $R_1$, $R_2$, $R_3$ and $R_4$ are n-butyl and $x$ is 2.

10. A compound as in claim 1 having a chemical name of bis(morpholino-thiocarbonyl-thiomethyl) disulfide.

No reference cited.

ALEX MAZEL, Primary Examiner

J. TOVAR, Assistant Examiner

U.S. Cl. X.R.

260—293.4; 326.83, 455, 784, 792, 798